N. PLYMPTON.
Tea-Pot.

No. 8,315. Reissued July 2, 1878.

Witnesses.
S. N. Piper
John R. Snow

Inventor.
Nathaniel Plympton.
by his attorney
R. H. Eddy

N. PETERS, PHOTO-LITHOGRAPHER, WASHINGTON, D. C.

UNITED STATES PATENT OFFICE.

NATHANIEL PLYMPTON, OF BOSTON, MASSACHUSETTS.

IMPROVEMENT IN TEA-POTS.

Specification forming part of Letters Patent No. 198,312, dated December 18, 1877; Reissue No. 8,315, dated July 2, 1878; application filed June 21, 1878.

*To all whom it may concern:*

Be it known that I, NATHANIEL PLYMPTON, of Boston, of the county of Suffolk and State of Massachusetts, have made a new and useful invention having reference to Tea-Pots or various other articles of like character; and do hereby declare the same to be described in the following specification and represented in the accompanying drawings, of which—

Figure 1:
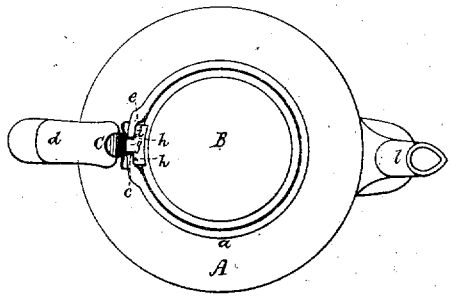
Figure 5:
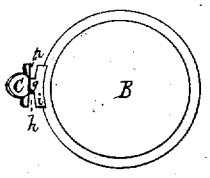
Figure 6:
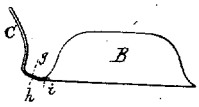
Figure 2:
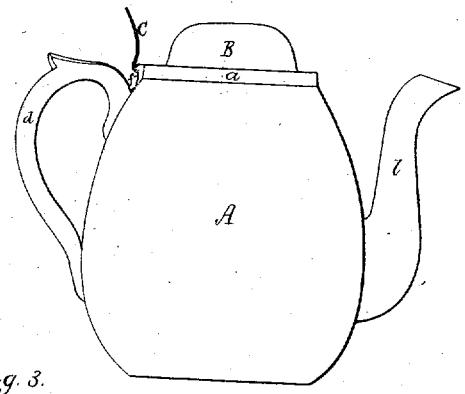
Figure 3:
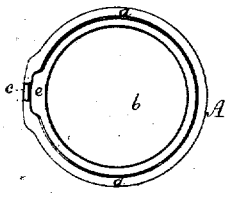
Figure 4:
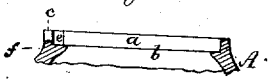

Figure 1 is a top view, and Fig. 2 a side elevation, of a tea-pot and cover provided with my invention. Fig. 3 is a top view, and Fig. 4 is a section, of the mouth or rim of the tea-pot, showing the notch *c* and recess *e*, to be hereinafter described. Fig. 5 is a top view, and Fig. 6 a side view, of the cover.

I would remark that my invention is specially intended for tea-pots, coffee-pots, cream or molasses pitchers, or such like vessels, made of porcelain or earthenware, and having their covers of like substance, or, what is better, of metal.

It is well known that a tea or coffee pot cover, unless hinged to the body of the pot, is very liable to fall off or out of place when the vessel is tipped or turned down.

My improvement is not only to enable the cover to be readily removed from the pot or to be tipped upward while in place, but to hold it in engagement with the pot while the latter may be in the act of being turned down for pouring a liquid from its nose or spout.

In carrying out my invention, I make or provide the rim *a*, usually surrounding the mouth *b* of the pot A, with a vertical notch, *c*, which I arrange in such rim next the handle *d* of such pot; or I make it with such a notch and with a recess, *e*, arranged as shown.

The rim at the notch and next the handle I form with an inclination or upward curve or notch, which is shown at *f* in Figs. 2 and 4.

The cover B has a handle, C, extended from it, in manner as represented. This handle, near its junction with the cover, I provide with two notches, *h h*, to form in it a neck, *g*, to enter the rim-notch *c*. The handle part *i*, which is between the cover and the said neck, is to enter the recess *e*. The extension or part *i* and the said recess not only serve to steady the cover while it may be in the act of being raised or depressed, but admit of it being thrown up higher than it could be were the rim curved at the notch and unprovided with the recess in connection with such notch. The cover-handle has its neck *g* bent at an obtuse angle to the part *i*. A short distance beyond the neck the handle is further bent upward nearly at a right angle, and thence backward, in manner as represented. The handle thus becomes somewhat hooked, so as to catch against or in the notch or curve *f*, in a manner to hold the cover from falling off the pot when the latter may be in the act of being turned down for discharging tea or a liquid from the nose *l*.

With a tea-pot or vessel of like character provided with my invention, the cover can be easily raised by the thumb of a person's hand that may be grasping the handle of the pot.

What I claim as of my invention is as follows:

1. An open earthenware or porcelain vessel or tea-pot, A, provided with the notches *c* and *f*, arranged in its mouth-rim *a*, substantially as set forth.

2. The pot-cover B, provided with the handle C, arranged with it, as set forth, and notched or having a neck, as described, to enter and co-operate with the notch *c*, arranged in the mouth-rim *a* of the body of the pot.

3. The open tea-pot or vessel A, provided with the notch *c* in its rim *a*, in combination with the cover B, furnished with the necked or notched handle C, arranged with such cover, as specified.

4. The open tea-pot or vessel A, provided with the notch *c* and recess *e*, in combination with the cover B, furnished with the necked or notched handle C, arranged with it, as set forth.

5. The open vessel or tea-pot A, provided with the notches *c* and *f*, arranged in its rim *a*, substantially as shown, in combination with the cover B, furnished with the necked or notched handle C, arranged with it, essentially as represented.

6. The open vessel or tea-pot A, provided with the recess *e* and the notches *c* and *f*, arranged in its mouth-rim *a*, as shown, in combination with the cover B, furnished with the necked or notched handle C, constructed and arranged with such cover, essentially as set forth.

7. The open vessel or tea-pot A, having the part or flange surrounding its mouth provided on its outer edge with a recess, *f*, and also having a cover, B, disconnected with the said pot, and furnished with a hooked handle or a projection to enter and catch against or in such notch or recess, and so co-operate therewith as to prevent the cover from falling off the pot or out of place while the pot is in the act of being inclined for discharge of liquid from its nose or spout.

NATH. PLYMPTON.

Witnesses:
R. H. EDDY,
JOHN R. SNOW.